United States Patent [19]

Renner et al.

[11] 4,082,354
[45] Apr. 4, 1978

[54] HEAD SUPPORT FOR BACKREST, ESPECIALLY OF MOTOR VEHICLES

[75] Inventors: Hermann Renner, Magstadt; Siegfried Wacker, Schonaich, both of Germany

[73] Assignee: Daimler-Benz Aktiengesellschaft, Stuttgart, Germany

[21] Appl. No.: 669,769

[22] Filed: Mar. 24, 1976

[30] Foreign Application Priority Data

Mar. 25, 1975 Germany ............................ 2513022

[51] Int. Cl.² .............................................. A47C 1/10
[52] U.S. Cl. .................................... 297/410; 297/391
[58] Field of Search .................. 297/61, 112, 114, 216, 297/390, 391, 396, 403, 410, 384; 280/748, 751, 573

[56] References Cited

U.S. PATENT DOCUMENTS

| | | | |
|---|---|---|---|
| 3,065,029 | 11/1962 | Spound et al. | 297/391 |
| 3,171,689 | 3/1965 | Chessrown | 297/391 |
| 3,781,061 | 12/1973 | Walz et al. | 297/390 |
| 3,838,870 | 10/1974 | Hug | 297/284 X |

Primary Examiner—James C. Mitchell
Attorney, Agent, or Firm—Craig & Antonelli

[57] ABSTRACT

A head support for seat backrests, especially of motor vehicle seats, which is adapted to be displaced from a rest or non-use position impairing as little as possible the visibility, for instance, of the driver toward the side of the vehicle or toward the rear of the vehicle, into an effective position; the movement of the head support thereby takes place automatically in dependence on the load on and removal of the load from the seat.

15 Claims, 1 Drawing Figure

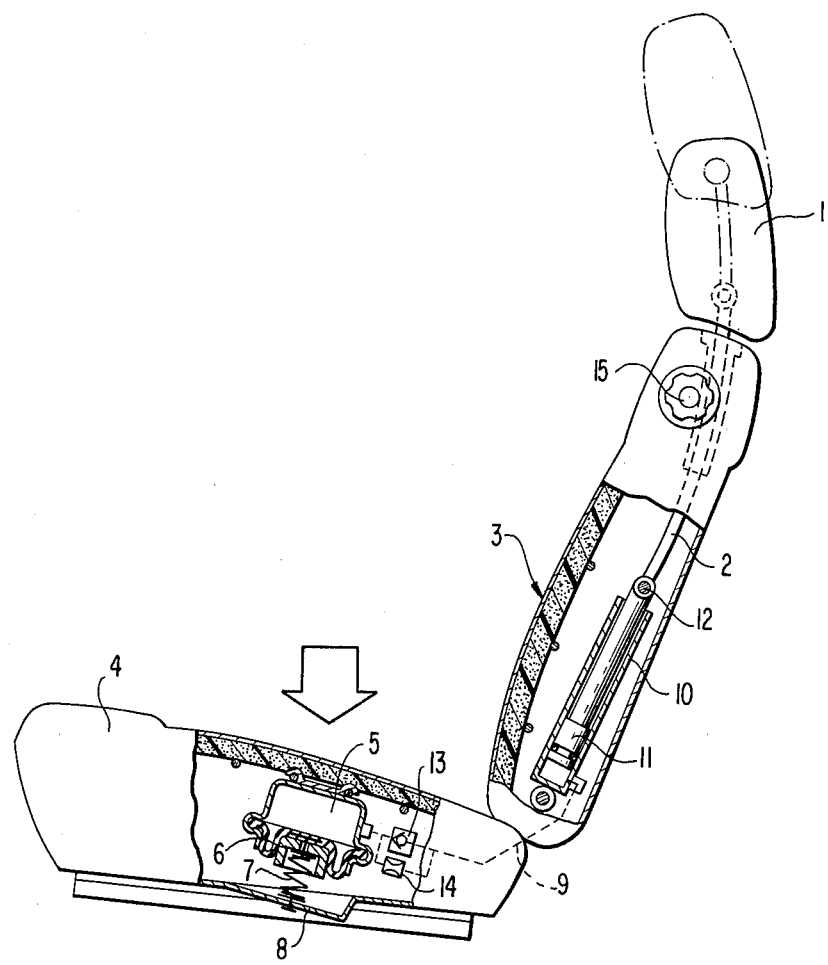

HEAD SUPPORT FOR BACKREST, ESPECIALLY OF MOTOR VEHICLES

The present invention relates to a head support for backrests, especially of motor vehicle seats, which is adapted to be moved from a rest or non-use position impairing as little as possible the visibility, for example, of the driver toward the side and toward the rear of the vehicle into an effective position.

Such headrests or head supports, which in the rest or non-use position, can be recessed, for example, into a recess of the backrest or can be folded into a position at the backside of the backrest, are already known in the art (for example, German Offenlegungsschrfit No. 1,655,057 and German Gebrauchsmuster No. 1,925,344). It is also known in the art to utilize an auxiliary force for purposes of moving the head support from one position into the other position, for example, in the form of a prestressed spring (U.S. Pat. No. 3,065,029).

The present invention is concerned with the task, starting from this state of the art, to provide an installation, by means of which it is assured that the movement of the head support into its effective position is able not to take place, for example, due to negligence on the part of the vehicle passengers because this would lead to an increased endangering of the passengers in the case of an accident.

This takes place according to the present invention in that the movement of the head support takes place automatically in dependence on the loading and unloading of the seat.

According to a preferred embodiment of the present invention, a tank or container filled with a pressure medium is arranged on the inside of the seat cushion, whose interior space is reduced in case of a load on the seat and which is connected by way of a pressure medium line with at least one working cylinder arranged on the inside of the backrest, whose piston is operatively connected with the linkage of the head support.

The tank or container is thereby advantageously constructed as working cylinder with elastic walls, which in case of load is inverted over a piston supported at the seat support frame.

A volume equalization of the cylinder spaces which is necessary by reason of the inward spring deflection depth of the seat cushion differing depending on the weight of the seat user and by reason of the differing use positions (extended heights) of the head support, is achieved in a simple manner in that the piston is supported by way of a non-prestressed spring at the seat support frame.

A completely satisfactory movement course of the head support during the extension and retraction as well as a quiescent remain in the use position for the duration of the seat load is assured if a check valve is arranged in the pressure medium line and a throttle is arranged in a line by-passing the check valve.

Finally, it is additionally advantageous if, for purposes of adaptation to the sizes of different seat users, an adjustable abutment is provided for limiting the outward movement or extension travel of the head support.

Accordingly, it is an object of the present invention to provide a head support for backrests, especially of motor vehicle seats, which avoids by simple means the aforementioned shortcomings and drawbacks encountered in the prior art.

Another object of the present invention resides in a head support for backrests, especially of motor vehicle seats, which assures a reliable movement of the head support into its effective position without the need for any interaction by the passenger.

A further object of the present invention resides in a head support for backrests, especially of motor vehicle seats, which increases the safety of the passengers in case of an accident, yet is extremely simple and reliable in operation.

Still another object of the present invention resides in a head support of the type described above in which the head support remains in its extended use position for the duration of the seat load without danger of any fluctuations in this extended position due to any possible dynamic load changes on the seat.

These and other objects, features and advantages of the present invention will become more apparent from the following description when taken in connection with the accompanying drawing which shows, for purposes of illustration only, one embodiment in accordance with the present invention, and wherein:

The single FIGURE is a side view of a motor vehicle seat, partly in cross section, with an automatic head support adjusting mechanism in accordance with the present invention.

Referring now to the single FIGURE of the drawing, the head support or headrest 1 of the seat of a motor vehicle, shown partly in cross section, is height-adjustably guided by way of a linkage 2 in the backrest 3 of the seat. The following installation is provided for the automatic extension of the head support 1 into the position illustrated in dash lines in case of a load on the seat.

A working cylinder 5 consisting of an elastic material and filled with a pressure medium (preferably air) is arranged on the inside of the seat cushion 4, which in case of load on the seat is being inverted over a piston 6 which, in its turn, is supported at the seat support frame 8 by way of a non-prestressed spring 7.

The working cylinder 5 is connected by way of a pressure medium line 9 with a further working cylinder 10 pivotally arranged in the backrest 3, whose piston 11 is operatively connected with the linkage 2 of the head support 1 under interconnection of a joint 12.

In order to assure a rapid extension of the head support 1 in case of a load and a slow lowering thereof in case of unloading of the seat and in order to additionally avoid a reacting of the head support to movements of the seat user which are unavoidable during the drive, a check valve 13 is arranged in the pressure medium line 9 and a throttle 14 is arranged in a further line by-passing the check valve 13.

In the upper area of the backrest 3, an adjusting mechanism 15 of conventional type and indicated only schematically is finally also provided for limiting the extension path of the headrest 1, i.e., the distance of the head support 1 will be extended in the upward direction.

The operation of the installation according to the present invention is as follows:

In case of load on the seat cushion 4 by the seat user, the seat cushion spring deflects inwardly to a depth of about 40 to 60 mm corresponding to the weight of the user. As a result thereof, the piston 6 supported at the seat frame 8 by way of a non-prestressed spring 7 penetrates into the cylinder 5 and displaces the pressure medium by way of the pressure medium line 9 into the working cylinder 10 of the backrest 3. The piston 11 which is thus extended or displaced outwardly displaces the head support 1 operatively connected therewith into its use position. With a continuing removal of the load from the seat cushion 4, the cylinder 5 connected with the spring core returns into its starting position and thus permits the head support 1 to return into its starting position.

The automatic extension and retraction of the head support 1 in dependence on the loading and unloading of the seat, of course, need not take place pneumatically or hydraulically—as illustrated in the embodiment—but may also be effected, for example, by an electric drive of conventional type.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A head support for backrests which is operable to be displaced to and from a non-use position and an effective position, characterized by control means for automatically moving the head support to said effective position in dependence on the load on and to said non-use position on removal of load from a seat means.

2. A head support for backrests according to claim 1, characterized in that the backrest forms part of a motor vehicle seat, and in that the head support is movable from its non-use position in which the visibility of a vehicle passenger toward the side and toward the rear is impaired as little as possible, into an effective position in which the head of the passenger is effectively supported by the head support.

3. A head support according to claim 2, with a seat cushion forming a part of the seat means, characterized in that a container means filled with a pressure medium is arranged on the inside of the seat cushion, wherein the interior space of the container means is reduced in case of said load on the seat means, and said container means being operatively connected by way of a pressure medium line with at least one working cylinder means arranged on the inside of the backrest, said cylinder means having a working piston means operatively connected with linkage means of the head support.

4. A head support according to claim 3, characterized in that the container means is constructed as another working cylinder means having elastic wall means which in case of a load on the seat means is positioned over another working piston means supported at a seat frame of the seat means.

5. A head support according to claim 4, characterized in that the working piston means is supported at the seat frame by way of a non-prestressed spring.

6. A head support according to claim 5, characterized in that a check valve means is arranged in the pressure medium line and a throttle means is arranged in a line by-passing the check valve means.

7. A head support according to claim 6, characterized in that an adjustable abutment means is provided for limiting the extension path of the head support.

8. A head support according to claim 1, with a seat cushion forming a part of the seat means, characterized in that a container means filled with a pressure medium is arranged on the inside of the seat cushion, wherein the interior space of the container means is reduced in case of said load on the seat means, and said container means being operatively connected by way of a pressure medium line with at least one working cylinder means arranged on the inside of the backrest, said cylinder means having a working piston means operatively connected with linkage means of the head support.

9. A head support according to claim 8, characterized in that the container means is constructed as another working cylinder means having elastic wall means which in case of a load on the seat means is positioned over another working piston means supported at a seat frame of the seat means.

10. A head support according to claim 9, characterized in that the working piston means is supported at the seat frame by way of a non-prestressed spring.

11. A head support according to claim 8, characterized in that a check valve means is arranged in the pressure medium line and a throttle means is arranged in a line by-passing the check valve means.

12. A head support according to claim 1, characterized in that an adjustable abutment means is provided for limiting the extension path of the head support.

13. A seat for automotive vehicles having seating means and a backrest means means, a head support means supported on said backrest means and operable to be displaced between a non-use position and an effective position, characterized by control means for automatically moving the head support to said effective position in dependence on the load on said seating means and to said non-use position on removal of load from said seating means.

14. A seat according to claim 13, further characterized in that a container means filled with a pressure medium is arranged within said seating means, wherein the interior space of the container means is reduced in case of said load on the seating means, and said container means being operatively connected by way of a pressure medium line with at least one working cylinder means arranged on the inside of the backrest means, said cylinder means having a working position operatively connected with linkage means of the head support.

15. A vehicle seat according to claim 14, further characterized in that the container means is constructed as another working cylinder means having elastic wall means which in case of a load on the seat means is positioned over another working piston means supported at a seat frame of the seating means.

* * * * *